United States Patent [19]
Milani

[11] Patent Number: 5,829,330
[45] Date of Patent: Nov. 3, 1998

[54] APPARATUS FOR CONTINUOUSLY CUTTING HOLLOW PROFILED MATERIAL TO SIZE

[75] Inventor: Antonio Milani, Lonate Pozzolo, Italy

[73] Assignee: Amut S.p.A., Novara, Italy

[21] Appl. No.: 764,924

[22] Filed: Dec. 16, 1996

[30] Foreign Application Priority Data

Oct. 25, 1996 [IT] Italy ................................ MI96A2218

[51] Int. Cl.⁶ ...................................................... B23B 5/14
[52] U.S. Cl. ..................................... 82/70.1; 82/48; 83/54
[58] Field of Search ............................... 82/48, 53.1, 83, 82/89; 83/54, 467.1, 155, 158

[56] References Cited

U.S. PATENT DOCUMENTS

| | | | |
|---|---|---|---|
| 684,539 | 10/1901 | Cartwright | 82/89 |
| 3,029,674 | 4/1962 | Southwell | 82/53.1 |
| 3,068,729 | 12/1962 | Johnson | 82/48 |
| 3,771,393 | 11/1973 | Gatto | 82/53.1 |
| 5,313,862 | 5/1994 | Johansson | 82/53.1 |
| 5,335,570 | 8/1994 | Ro | 82/89 |

*Primary Examiner*—A. L. Pitts
*Assistant Examiner*—Mark Williams
*Attorney, Agent, or Firm*—IP Group of Pillsbury Madison & Sutro LLP

[57] ABSTRACT

An apparatus for continuously cutting hollow profiled material to size, including an entry unit for supporting a hollow profiled product towards a rotary head which cooperates with a fixed cutting unit provided with at least one cutting blade to be inserted into an interspace provided in the rotary head in correspondence with at least one sleeve through which the continuous hollow profiled product is made to pass. With the cutting unit there is associated a mechanical stop for the free end of the advancing hollow profiled product.

11 Claims, 3 Drawing Sheets

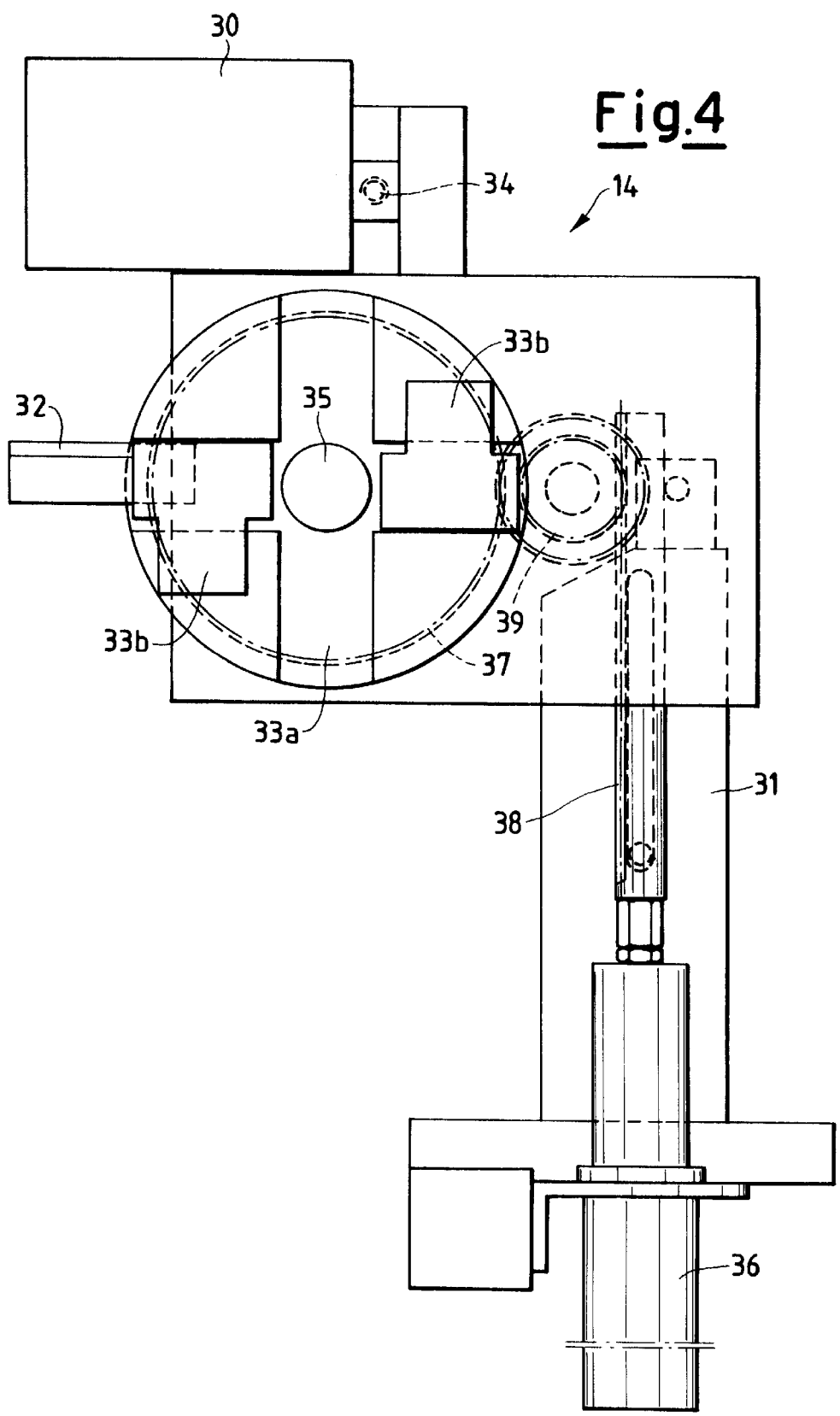

APPARATUS FOR CONTINUOUSLY CUTTING HOLLOW PROFILED MATERIAL TO SIZE

BACKGROUND OF THE INVENTION

This invention relates to an apparatus for continuously cutting hollow profiled material to size.

The term "hollow profiled material" is used in this description to mean any hollow profiled product of any cross-section, such as round, square, rectangular, shaped etc., constructed for example of a thermoplastic material, rubber, polytetrafluoroethylene, wood, cardboard, etc.

For cutting a hollow profiled product of the aforesaid type to size in the form of pieces of suitable length, apparatuses have been designed which cut the advancing hollow profiled product by rotary blades. Although this on the one hand results in a considerable time saving by avoiding stoppage of the advancing hollow profiled product, on the other hand it does not allow a perfect cut to be made perpendicular to the axis of the hollow profiled product.

Moreover, these rotary blades act directly on the hollow profiled product with a certain violence which can result in compression with deterioration of the finished cut product. Such a problem arises in particular when the thickness of the hollow profiled product is small and is unable to support the violent cutting action exerted by the rotary blades.

A further drawback of cutting with rotary blades is that the size of the cut product is not always the same. This occurs because the correct length of the cut product cannot be easily or reliably determined on the basis of a constant speed of advancement of the hollow profiled product to be cut.

A further drawback of cutting apparatus of rotary blade type for tubular profiled products is the problem of blade replacement. In this respect, to effect such a replacement in known apparatus, the entire line has to be halted, with obvious production loss and cost increase.

SUMMARY OF THE INVENTION

An object of the present invention is to provide an apparatus for continuously cutting hollow profiled material to size, which is able to solve all the aforesaid problems.

A further object is to provide an apparatus for continuously cutting hollow profiled material to size, which is of extremely simple construction and operation, while at the same time being of low acquisition and maintenance costs.

These objects are attained according to the present invention by an apparatus for continuously cutting hollow profiled material to size, comprising an entry unit for supporting a hollow profiled product towards a rotary head which cooperates with a fixed cutting unit provided with at least one cutting blade to be inserted into an interspace provided in the rotary head in correspondence with at least one sleeve through which the continuous hollow profiled product is made to pass, with the cutting unit there being associated a mechanical stop for the free end of the advancing hollow profiled product.

BRIEF DESCRIPTION OF THE DRAWINGS

The characteristics and advantages of an apparatus for continuously cutting hollow profiled material to size according to the invention will be more apparent from the description thereof given hereinafter by way of non-limiting example with reference to the accompanying schematic drawings, in which:

FIG. 4 is an elevation of the unit carrying the cutting elements in the apparatus of FIG. 1.

DETAILED DESCRIPTION

Figure 1:
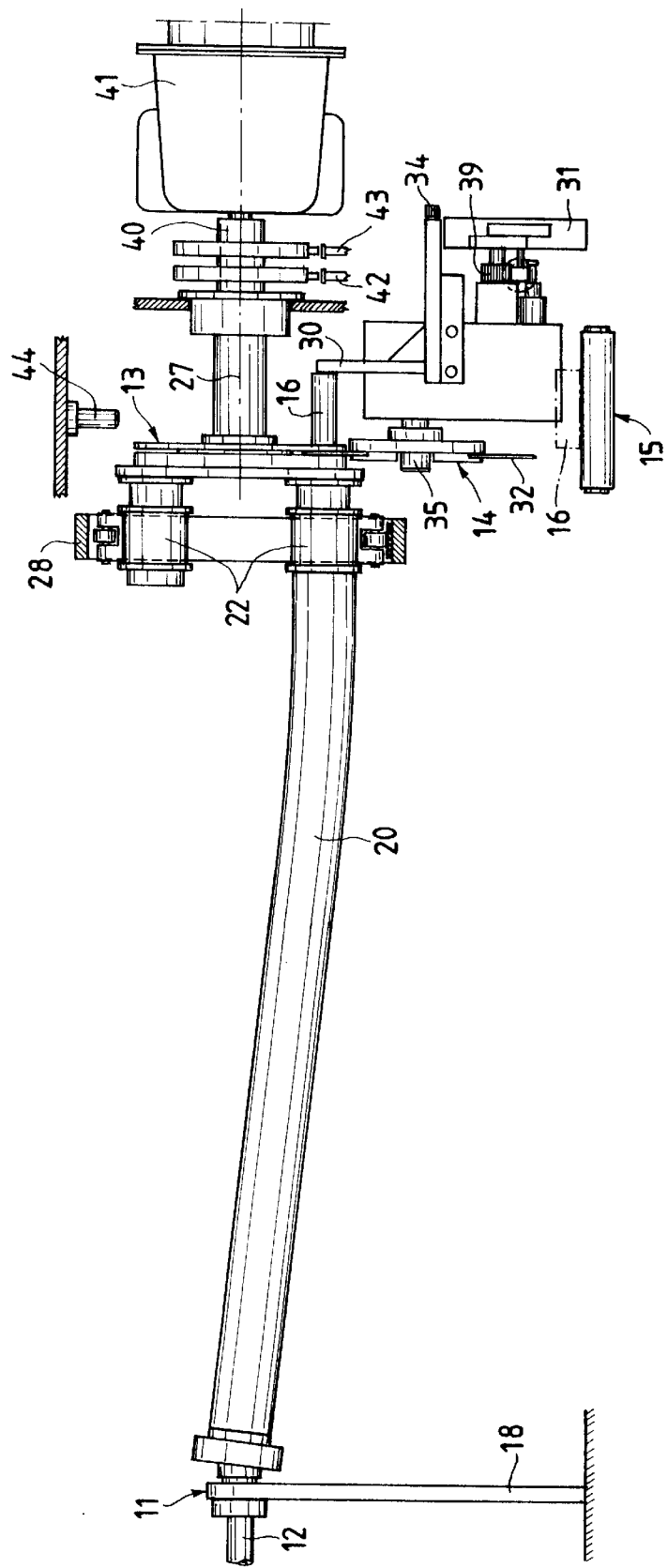
FIG. 1 is a side elevation of an apparatus for continuously cutting a profiled hollow product to size formed in accordance with the present invention.
Figure 2:
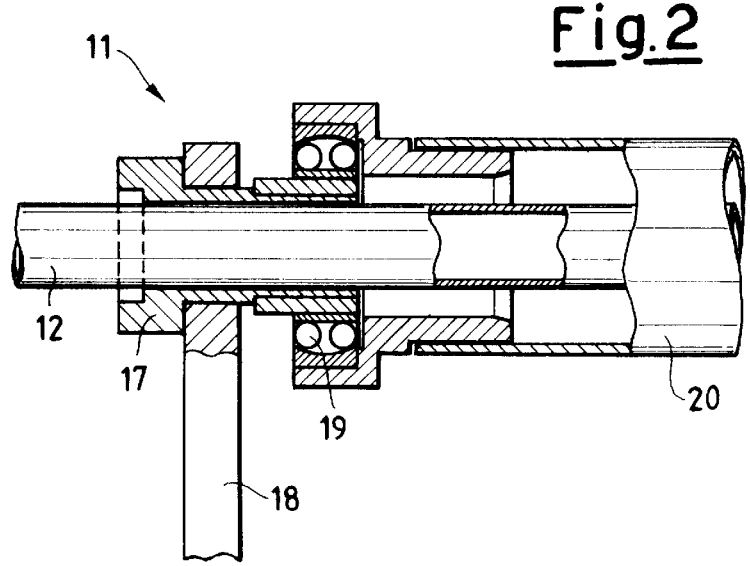
FIG. 2 is a partly sectional enlarged elevation of an entry and support unit for the hollow profiled product in an apparatus according to the invention.
Figure 3:
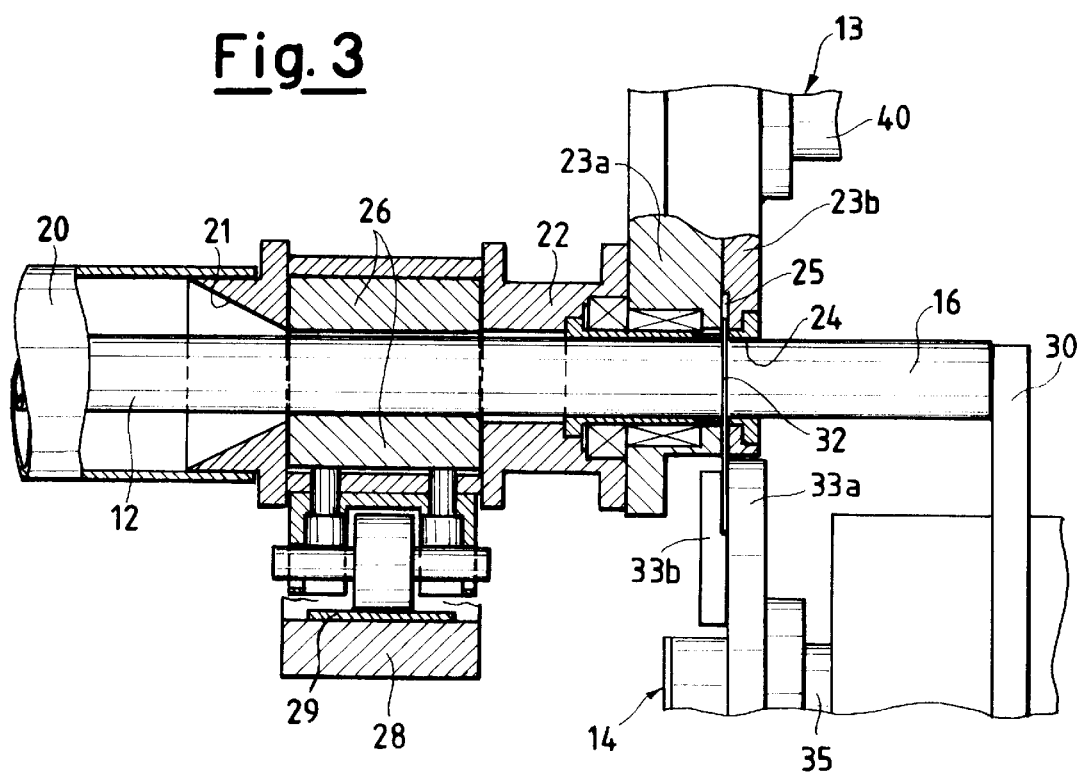
FIG. 3 is an enlarged section through a part of the cutting region of the apparatus of FIG. 1.

FIG. 1 schematically shows an apparatus for continuously cutting hollow profiled material to size, according to the present invention.

It should firstly be noted that the term "hollow profiled material" means any hollow profiled product of any cross-sectional shape, such as round, square, rectangular, shaped, etc., constructed for example of thermoplastic material, rubber, polytetrafluoroethylene, wood, cardboard, etc.

Such an apparatus for continuously cutting hollow profiled material to size comprises essentially an entry unit 11 for supporting the hollow profiled product 12 towards a rotary head 13 which cooperates with a cutting unit 14. There is also provided an underlying conveyor unit 15 for cut pieces 16 obtained in this manner from the hollow profiled product 12.

The hollow profiled product 12 can originate either directly from the production machine, such as an extruder, or from a reel of hollow profiled product which stores it.

The entry and support unit 11 comprise an entry die 17, positioned on an upright 18, and within which the hollow profiled product 12 is guided. To the die 17 there is connected a guide 20 which at one end is provided with a flange with self-aligning bearings 19. The guide 20 consists of a tubular element, for example of semirigid plastics of diameter greater than that of the tubular profiled products which have to pass through it to be subsequently cut to size.

At its other end the guide 20 is rigidly connected to the rotary head 13 in correspondence with a mouthpiece 21 of a sleeve 22 rigid with a rotary plate 23a and 23b. The rotary plate 23a and 23b in the form of a disc can carry several sleeves of different inner diameter so as to be able to treat tubular profiled products of different outer diameter. These sleeves are positioned on the first part of the rotary plate 23a in correspondence with through apertures 24 provided in the entire plate. Specifically, the plate consists of a first flange part 23a and a second backing flange part 23b. Between the flange 23a and the backing flange 23b there is an interspace 25 into which a cutting blade is inserted to enable the hollow profiled product 12 contained and guided within the sleeve 22 to be cut during the rotation of the entire plate.

In this respect, to facilitate cutting, within the body of the sleeve 22 there are inserted presser elements 26 which can move in a direction radial to the axis 27 of the rotary head 13.

Generally these presser elements 26, in that outer part thereof facing outwards, for example carrying a roller, face a ring 28 which surrounds the sleeves 22 and carries a cam 29 in correspondence with the cutting station on which they interact. The cam 29 faces radially inwards, its purpose being to act on the roller of the presser element 26 to cause it to move inwards towards the axis 27. This movement causes the presser element 26 to lock the hollow profiled product 12 within the sleeve exactly at that moment in which the tubular profiled piece 16 is cut off.
}

It should be noted that to achieve the desired size of the piece to be cut off, the front part or head of the hollow profiled product abuttingly engages against a mechanical stop 30, which can be adjusted in position by an adjustment knob 34. The mechanical stop 30 can be associated with the structure of the cutting unit 14.

In this respect it should be noted that the cutting unit 14 comprises a frame 31 which in addition to the mechanical stop 30 carries a rotatable support plate for cutting blades 32. This plate consists of a flange 33a and a backing flange 33b between which in the illustrated embodiment two cutting blades 32 are locked. Preferably the backing flange 33b is formed in two separate parts so as to be able to replace even a single blade 32 without involving the other blade or blades and without interrupting the operation of the apparatus. The arrangement comprising more than one blade 32 enables one blade to be located in its working position and another in the rest and replacement position.

The plate comprising the flange 33a and backing flange 33b can be rotated by virtue of being connected to a shaft 35 rotatable by an actuator, such as a pneumatic cylinder 36 the rod of which carries a rack 38 which interacts with a double pinion 39 which itself engages a gearwheel 37 positioned on the shaft 35. This drive can be activated by a central processor, not shown, or operated manually.

Cutting the hollow profiled product 12 into pieces 16 of predetermined size is hence achieved by rotating the product contained in the respective sleeve 22. The product 12, on abutting against the stop, assumes the predetermined size and halts its advancement. The fixed cutting blade 32 is inserted between the rotating flange 23a and backing flange 23b, the contained hollow profiled product 12 then being cut at the rear end.

It should be noted that the flange 23a and backing flange 23b are rotated by a drive shaft 40 operated by a motor, such as a three-phase induction motor 41, for example of self-braking type, served by an inverter 46 and a reduction gear 45 directly coupled to the motor. On the drive shaft 40 there are mounted two sensors 42 and 43, the first cooperating in providing the enabling command for halting the rotary head 13 always in the same predetermined position. The second sensor 43 operates for the automatic exchange of the cutting blade 32.

Immediately downstream of the flange 23a and of the backing flange 23b there is provided a sensor 44 which identifies the presence of the hollow profiled product and provides the enabling command for starting the motor 41 of the rotary head 13. The sensor 44 is also used to determine the start of the underlying conveyor unit 15 which receives the cut pieces 16 and discharges them to the exterior of the apparatus.

As can be seen, an apparatus according to the present invention has an extremely simple and versatile structure and operates with extreme reliability.

In this respect, the hollow profiled product 12 to be cut into pieces is fed into the entry and support unit 11 and passes through the entry die 17 before being inserted into the semirigid guide 20. As its insertion proceeds, the hollow profiled product 12 arrives at the selected mouthpiece 21 and passes through the sleeve 22 located to the rear of it. On leaving the sleeve 22 the end of the hollow profiled product abuts against the mechanical stop 30.

The passage of the hollow profiled product 12 is sensed by the sensor 44 which hence authorizes the starting of the motor 41 of the rotary head 13. The motor 41 hence operates and the rotary had 13 begins to rotate, entraining in a circular movement that end of the hollow profiled product fixed to it. The guide 20 hence begins to move and describe the lateral surface of a solid fairly similar to a cone of profiled surface.

This circular movement of the head 13 entrains the front end of the hollow profiled product 12 with an equivalent movement. When the sleeve 22 through which the hollow profiled product passes reaches a position corresponding with the cam 29, this latter operates the presser element 26, which instantaneously locks the product. During this locked period the hollow profiled product, which abuts against the mechanical stop, interferes with the fixed cutting blade 32 and is cut. As stated, the cutting blade 32 is inserted into the interspace 25 between the flange 23a and the backing flange 23b which rotate together with the sleeve 22.

As the rotation of the rotary head 13 continues, the piece 16 of hollow profiled product 12 cut off in this manner falls onto the underlying conveyor unit 15, which removes and discharges it.

It will be noted that advantageously this solves the problem of the perpendicular cutting of the piece 16 and its correct size, by virtue of the fact that the cutting blade is fixed and the mechanical stop is also fixed.

Moreover because of the presence of several sleeves on the rotary head, the apparatus can be rapidly adjusted to different outer diameters of the hollow profiled product to be cut. With the apparatus of the invention it is also possible with extreme ease to vary the length of the piece 16 of product cut off both on the basis of the rotational speed of the rotary head and on the basis of the advancement speed of the product to be cut. Moreover if these parameters are maintained unaltered, it is also possible to vary the position of the mechanical stop 30 by operating the adjustment knob 34.

The problem of replacing the cutting blade, which in known apparatus involves considerable difficulty, is also solved. In this respect, by means of a manual or processor command, the support plate 33a and 33b for the cutting blades 32 is made to rotate. In the illustrated and described embodiment involving two blades it is rotated through 180° by means of the cylinder 36, the rack 38 and the relative transmission. The second cutting blade 32 is hence positioned in correspondence with the interspace 25, while the used blade reaches a rest and replacement position, without any need to halt the entire apparatus. In this respect the operator can change the used cutting blade while the hollow profiled product continues to advance and be cut into pieces by the other blade.

I claim:

1. An apparatus for continuously cutting hollow profiled material to size, comprising:

a rotary head;

a fixed cutting unit;

an entry unit for urging a hollow profiled product towards said rotary head;

said rotary head being arranged to cooperate with said fixed cutting unit;

said fixed cutting unit being provided with at least one cutting blade arranged to be inserted into an interspace provided in said rotary head in alignment with at least one sleeve through which, in use, said continuous hollow profiled product is made to pass; and with said cutting unit (14) there being associated a mechanical stop for engaging a free end of said advancing hollow profiled product.

2. The apparatus as claimed in claim 1, further comprising:

in alignment with said cutting unit, an underlying conveyor unit arranged for conveying pieces cut from said hollow profiled product.

3. The apparatus as claimed in claim 1, wherein:

said at least one cutting blade includes at least two cutting blades; and said cutting unit comprises a plate having a flange and a backing flange, between which said at least two cutting blades are locked.

4. The apparatus as claimed in claim 3, wherein:

said backing flange has at least two separate parts, each each for locking a respective one of said at least two cutting blades.

5. The apparatus as claimed in claim 3, further comprising:

an actuator;

a sensor;

said rotary head having a shaft;

said plate being arranged to be caused to rotate by said actuator in response to a command originating from said sensor associated with said shaft of said rotary head.

6. The apparatus as claimed in claim 1, wherein:

said rotary head comprises a rotary plate within which said interspace is provided.

7. The apparatus as claimed in claim 6, wherein:

said rotary plate comprises a first part carrying at least two sleeves, and a second part;

said rotary head includes a drive shaft of a self-braking three-phase induction motor served by an inverter and a reduction gear; and said first and second parts are associated with one another on said drive shaft.

8. The apparatus as claimed in claim 1, further comprising:

with said rotary head there is associated a presser element which interacts with a fixed cam in correspondence with a cutting region when said cutting blade is engaged on said hollow profiled product, in order to securely lock said hollow profiled product.

9. The apparatus as claimed in claim 8, wherein:

said cam is positioned on a fixed annular element located external to said rotary head.

10. The apparatus as claimed in claim 8, further comprising:

a motor arranged for rotating said rotary head;

said presser element being correlated with a sensor for halting said motor and therefore rotation of said rotary head when said hollow profiled product, contained within said at least one sleeve enters into engagement with said at least one cutting blade.

11. The apparatus as claimed in claim 1, wherein:

said entry unit comprises an entry die positioned on an upright element and connected to a guide which is provided at an end thereof with a flange having self-aligning bearings, said guide consisting of a semirigid tubular element connected to said die and to said rotary head.

* * * * *